(12) United States Patent
Murphy et al.

(10) Patent No.: US 6,343,168 B1
(45) Date of Patent: Jan. 29, 2002

(54) OPTICAL SENSOR ARRANGEMENT

(75) Inventors: Kent A. Murphy, Troutville; Mark E. Jones, Blacksburg, both of VA (US)

(73) Assignee: Luna Innovations, Inc., Blacksburg, VA (US)

( * ) Notice: Subject to any disclaimer, the term of this patent is extended or adjusted under 35 U.S.C. 154(b) by 0 days.

(21) Appl. No.: 09/476,656

(22) Filed: Dec. 31, 1999

Related U.S. Application Data

(63) Continuation-in-part of application No. 08/942,927, filed on Oct. 2, 1997, now Pat. No. 6,021,240.

(51) Int. Cl.[7] .................................................. G02B 6/34
(52) U.S. Cl. ........................ 385/37; 385/24; 385/12; 250/227.14
(58) Field of Search .............................. 385/37, 24, 12; 250/227.14, 227.18, 227.23

(56) References Cited

U.S. PATENT DOCUMENTS

| | | |
|---|---|---|
| 4,844,613 A | 7/1989 | Batchelder et al. |
| 4,929,049 A | 5/1990 | LeGoullon et al. |
| 5,026,139 A | 6/1991 | Klainer et al. |
| 5,064,619 A | 11/1991 | Finlan |
| 5,067,788 A | 11/1991 | Jannson et al. |
| 5,173,747 A | 12/1992 | Bolarski et al. |
| 5,253,037 A | 10/1993 | Klainer et al. |
| 5,359,680 A | 10/1994 | Riviere |
| 5,430,817 A | 7/1995 | Vengsarkar |
| 5,485,277 A | 1/1996 | Foster |
| 5,492,840 A | 2/1996 | Malmqvist et al. |
| 5,641,956 A | 6/1997 | Vengsarkar et al. |
| 5,647,039 A | 7/1997 | Judkins et al. |
| 5,757,540 A | 5/1998 | Judkins et al. |
| 5,864,641 A | 1/1999 | Murphy et al. |
| 6,035,082 A * | 3/2000 | Murphy et al. ............ 385/37 |
| 6,275,628 B1 * | 4/2001 | Jones et al. ............... 385/29 |

OTHER PUBLICATIONS

V. Bhatia et al., "Optical Fiber Long–Period Grating Sensors," *Lightnews*, Winter 1995, pp. 6–11.

K. O. Hill et al., "Photosensitivity in Optical Fiber Waveguides: Application to Reflection Filter Fabrication," *Appl. Phys. Lett.*, 32(10), May 15, 1978, pp. 647–649.

T. A. Tran et al., "Real–time immunoassays using fiber optic long–period grating sensors," *Biomedical Sensing, Imaging and Tracking Technologies I*, Proceedings SPIE—The International Society for Optical Engineering, R.A. Lieberman et al., Eds., vol. 2676, Jan. 29–31, 1996, pp. 165–170.

A. M. Vengsarkar et al., "Long–Period Fiber Gratings as Gain–Flattening and Laser Stabilizing Devices," *Tenth International Conference on Integrated Optics and Optical Fibre Communication*, vol. 5, Jun. 26–30, 1995, pp. 3–4.

(List continued on next page.)

*Primary Examiner*—Cassandra Spyrou
*Assistant Examiner*—Fayez Assaf
(74) *Attorney, Agent, or Firm*—Joy L. Bryant

(57) ABSTRACT

An optical sensor arrangement is provided. The arrangement comprises a light source coupled to an optical waveguide. The optical waveguide has at least one long period grating that promotes an excitation of confined propagating light into higher order modes causing an excitation of a sensing mechanism. A detector is coupled to the optical waveguide to detect a resulting optical signal.

7 Claims, 2 Drawing Sheets

OTHER PUBLICATIONS

A. M. Vengsarkar et al., "Long–Period Fiber Gratings as Band–Rejection Filters," *Journal of Lightwave Technology,* vol. 14, No. 1, Jan. 1996, pp. 58–65.

A. M. Vengsarkar et al., "Long–Period Cladding–Mode–Coupled Fiber Gratings: Properties and Applications," 1995 Technical Digest Series, vol. 22, Sep. 9–11, 1995, pp. SaB2–1–SaB2–4.

A. M. Vengsarkar et al., "Long–Period Gratings as Band–Rejection Filters," *OFC '95,* Feb. 26–Mar. 3, 1995, pp. PD4–1–PD4–5.

E. Stenberg et al., "Quantitative Determination of Surface Concentration of Protein with Surface Plasmon Resonance Using Radiolabeled Proteins," *Journal of Colloid and Interface Science,* vol. 143, No. 2, May 1991, pp. 513–526.

L. De Maria et al., "Fiber–optic sensor based on surface plasmon interrogation," *Sensors and Actuators,* B. 12, Dec. 21, 1992, pp. 221–223.

R. C. Jorgenson et al., "A fiber–optic chemical sensor based on surface plasmon resonance," *Sensors and Actuators,* B.12, Dec. 20, 1992, pp. 213–220.

Frances S. Ligler et al., "The Antibody–Based Biosensor: A Technology for Today", *Navel Research Reviews,* Three 1994, pp. 13–17.

G. P. Anderson et al., "Development of an Evanescent Wave Fiber Optic Biosensor," *IEEE Engineering in Medicine and Biology,* Jun./Jul. 1994, pp. 358–363.

* cited by examiner

OPTICAL SENSOR ARRANGEMENT

CROSS-REFERENCE TO RELATED APPLICATIONS

This application is a continuation-in-part of U.S. patent application Ser. No. 08/942,927 filed Oct. 2, 1997, entitled, "Optical Sensor Activation Device," which has issued as U.S. Pat. No. 6,021,240.

FIELD OF THE INVENTION

The present invention relates to optical sensor arrangements. In particular, it relates to an optical sensor arrangement comprising an optical waveguide and at least one long period grating.

BACKGROUND OF THE INVENTION

Optical sensing approaches for biological and chemical measurements have generally relied on fluorescence and surface plasmon resonance (SPR) techniques. Non-optical based sensors are far less sensitive than SPR sensors, and employ radiolabeled and fluorescently labeled proteins in immunoassay formats. The reduced sensitivity of the non-optical sensors creates measurement inaccuracies and requires more tightly-controlled testing environments.

Contemporary bulk SPR-based techniques are difficult to transition into a mobile platform because critical component alignments cannot be maintained in a field environment. Impractical size and weight ramifications are necessary to "ruggedize" current systems. Attempts to solve this dilemma have resulted in the creation of portable sensing systems through the construction of optical fiber versions of both SPR and optical fluorescence systems. These devices, however, are severely limited. In both the "ruggedized" and the portable sensing scenarios, time-consuming and expensive manufacturing processes are required.

Jorgenson et al., (R. C. Jorgenson and S. S. Yee, "A Fiber-Optic Chemical Sensor Based On Surface Plasmon Resonance", *Sensors and Actuators B*, volume 12, pages 213–220, 1993), demonstrated an SPR approach in a fiber optic configuration. Their approach involved a fiber-optic SPR sensing configuration that did not require a light-coupling prism. They disclose the sensing element as a segment of fiber in which the cladding has been removed and a 550 ∈ thick silver film has been symmetrically deposited on the fiber core, via electron-beam evaporation. Removal of the cladding enables the light to interact with the metallic layer.

Frances Ligler et al., (Frances S. Ligler, Lisa C. Shriver-Lake, Joel P. Golden, and George P. Anderson, "The Antibody-Based Biosensor: A Technology For Today", *Naval Research Reviews*, vol. 46, 3: 13–17, 1994) employed long optical fibers as a detection means that could easily be manipulated into various sample containers. They removed the plastic cladding to fabricate the sensing region before antibodies were attached and the fiber immersed in the sample. As fluorescent light returns up the fiber, it passes from the unclad region of the fiber into the clad region of the fiber. The antibodies were used to capture dye-marked targets, with the returning fluorescent signal indicating target strength. It was found, however, that much of the emitted light was lost into the cladding, thus necessitating changing the geometry of the fiber. Ligler et al. tapered the fiber to enhance both the distribution of the excitation light throughout the length of the probe region and the preservation of the returning fluorescent signal. This probe uses light propagating in the tapered region of the optical fiber to produce an evanescent field extending into the coating.

Anderson et al., (George P. Anderson, Joel P. Golden, Lynn K. Cao, Daya Wijesuriya, Lisa C. Shriver-Lake, and Francis S. Ligler, "Development of an Evanescent Wave Fiber Optic Biosensor", IEEE Engineering in Medicine and Biology, 358–363, June/July 1994), disclosed a fiber optic biosensor where several centimeters of cladding area are removed along the fiber's distal end. Recognition antibodies are immobilized on the exposed core surface. These antibodies bind fluorophore-antigen complexes within the interaction region of the evanescent wave. The evanescent wave effectively penetrates less than a wavelength beyond the core into the surrounding medium and is what excites the fluorescent molecules in complexes bound to the surface of the waveguide core. The resulting fluorescence couples into the cladded core of the immersed optical fiber. This immersed probe functions as a dielectric waveguide with the aqueous buffer as the cladding medium. The fluorescent signal generated within the probe is then transmitted to the fluorimeter through the clad fiber. They further disclosed that the primary difficulty in utilizing the core surface as the sensing region is that removing the cladding causes an abrupt disturbance in the dielectric structure of the optical fiber. Because the immersed core supports more modes than the clad fiber, some of the fluorescent signal is lost upon entry into the clad fiber.

Compounding this difficulty, fluorescence coupling from outside the core propagates primarily in the highest-order modes available, thus exacerbating signal loss from V-number mismatch. To solve this problem, Anderson et al. provided a combination tapered probe by removing the buffer and most of the cladding from the distal end of the fiber. This created a probe that tapered from the original radius rapidly down to a V-number matching radius, while maintaining total internal reflection. They note that it is critical that the probe be reduced to the V-number matching radius to ensure that fluorescence entering the fiber probe will be captured in modes that also propagate in the clad fiber.

The primary failure of this sensor is that the physical dimensions of the optical fiber must be altered to effectively excite the sensing mechanism. Etching techniques usually involve exposing an optical fiber to a chemical bath for a set period, followed by a stop bath, thus etching away a significant portion of the cladding and producing a brittle structure through the removal of protective buffer coatings, reduction of fiber diameter, adverse handling of exposed unprotected fiber, and increased probability of microcracks. Furthermore, the process of precise uniform etching of optical fibers is tedious, time-consuming, involves hazardous materials, and is not cost-effective for mass produced devices.

Tapering of an optical fiber creates similar problems. One method of tapering an optical fiber involves securing the fiber at two discrete locations. The fiber is then exposed to a localized high temperature perturbation, such as a propane torch, to soften the optical fiber. As the glass structure melts, the optical fiber is simultaneously pulled by opposing forces, resulting in a tapered reduction of the fiber diameter.

Etching and tapering of optical fibers is difficult to control and results in a weakened sensing element. Prior methods have required these steps to either excite an SPR wave in a metallic layer on the fiber or create an evanescent wave to excite captured targets dyed with fluorescent material. The present invention, does not require etching or tapering of an optical fiber. Rather, it utilizes a long period grating to excite confined propagating light into higher order modes which causes an excitation of a sensing mechanism such as an SPR wave or a bound fluorescent material. The sensing mechanism causes an interaction with the evanescent field which is generated by the long period grating. A detector is used to measure the resulting response to the interaction. This yields tremendous advantages because long period gratings may be produced cost-effectively, in large volumes, and without causing any degradation in fiber strength.

An object of the present invention is to provide an optical sensor arrangement that does not require etching or tapering of the waveguide.

Another object of the present invention is to provide an optical sensor arrangement that has an optical waveguide having at least one long period grating that promotes an excitation of confined propagating light into higher order modes which causes an excitation of a sensing mechanism.

SUMMARY OF THE INVENTION

By the present invention, an optical sensor arrangement is provided. The optical sensor arrangement comprises a light source coupled to an optical waveguide. At least one long period grating is disposed within the optical waveguide. The long period grating has a plurality of index perturbations spaced apart by a period distance $\Lambda$. The long period grating promotes an excitation of confined propagating light into higher order modes which causes an excitation of a sensing mechanism. This excitation causes an interaction with the evanescent field which is generated by the long period grating. A detector is coupled to the optical waveguide and detects a resulting optical signal.

Additional objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawings illustrate a complete embodiment of the invention according to the best modes so far devised for the practical application of the principles thereof, and in which.

DETAILED DESCRIPTION OF THE PREFERRED EMBODIMENTS

The sensors used in the optical sensor arrangement of the present invention provide an increase in sensitivity over those of the prior art, yet do not require the alteration of the physical dimensions of an optical waveguide. Because the coupling wavelength of these sensors is dependent upon the grating periodicity, the sensors used in the present invention may be designed at various wavelengths and demodulated using standard wavelength division multiplexing techniques. The manufacturing processes employed to produce the sensors of the present invention are more efficient, accurate, and economic than current processes.

Figure 1:
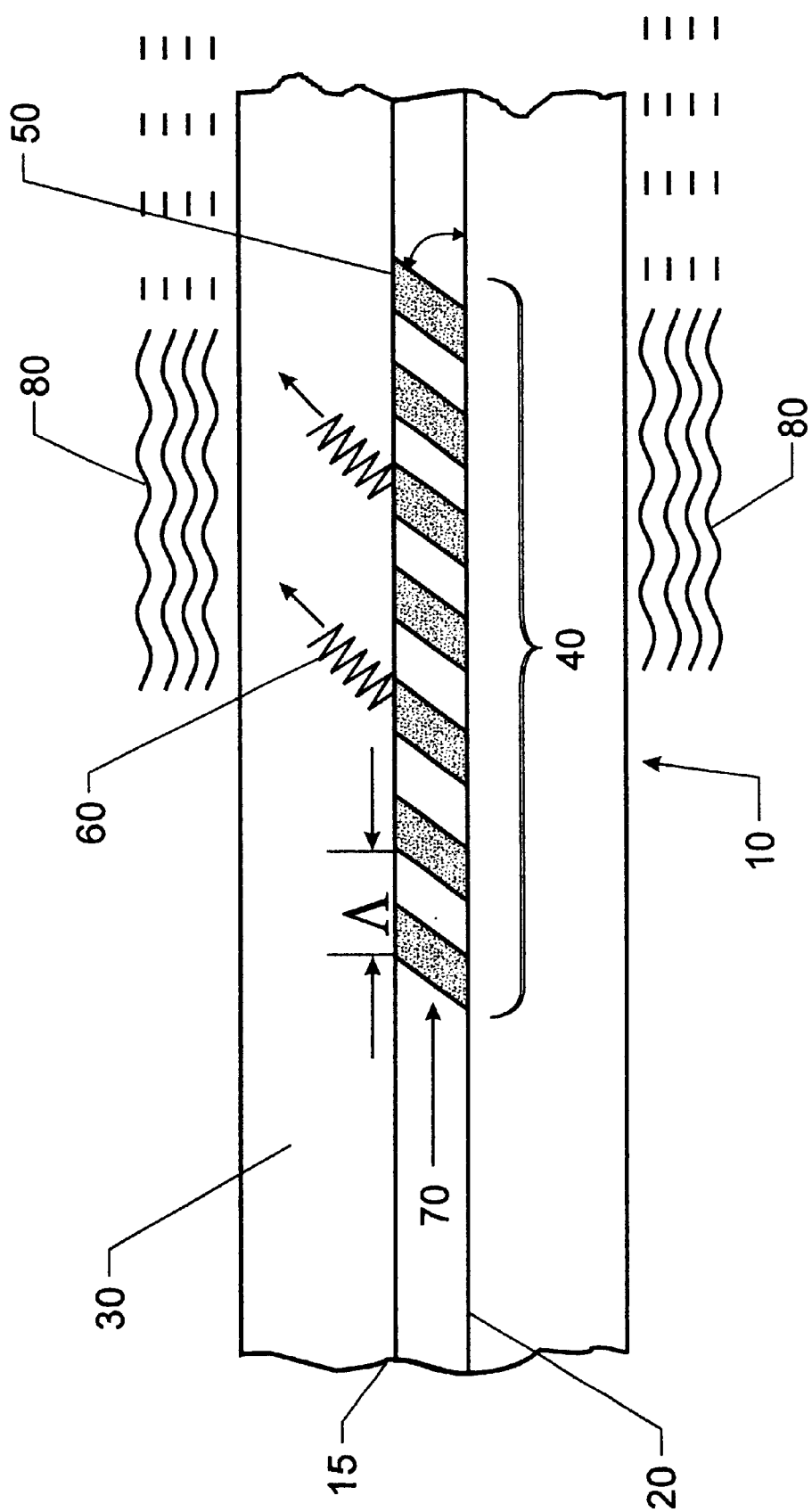
FIG. 1 is a schematic cross-section of an optical waveguide sensor having a long period grating disposed therein.

Referring now to the figures where similar elements are labeled the same throughout, FIG. 1 depicts an optical waveguide sensor 10 that is used in the arrangement of the present invention. For simplicity, the optical waveguide 15 shown is a fiber optic waveguide although, the optical waveguide 15 may be any optical waveguide known to those skilled in the art, such as: a planar optical waveguide or an integrated optic waveguide. The fiber optic waveguide core 20 is surrounded by a cladding 30 and includes one or more long period gratings 40. Each long period grating 40 has a plurality of index perturbations 50 spaced apart by a periodic distance $\Lambda$. The periodic distance $\Lambda$ $\Lambda$ may be either regular or irregular and is typically within the range: $10\,\mu m \leq \Lambda \leq 1500\,\mu m$. When in use, the long period grating 40 promotes an excitation of confined propagating light 70 into higher order modes 60. This excitation is spectrally dependent on the periodic distance $\Lambda$ of the long period grating 40 and the refractive index profile of the optical waveguide 15. The light in the higher order modes 60 excite a sensing mechanism 80. The sensing mechanism 80 is any sensing mechanism known to those skilled in the art and in particular is: an absorption mechanism; a polarization mechanism; a phase changing mechanism; an electromagnetic property changing mechanism; or a fluorescent signal. The sensing mechanism causes an interaction with the evanescent field which is generated by the long period grating.

Figure 2:
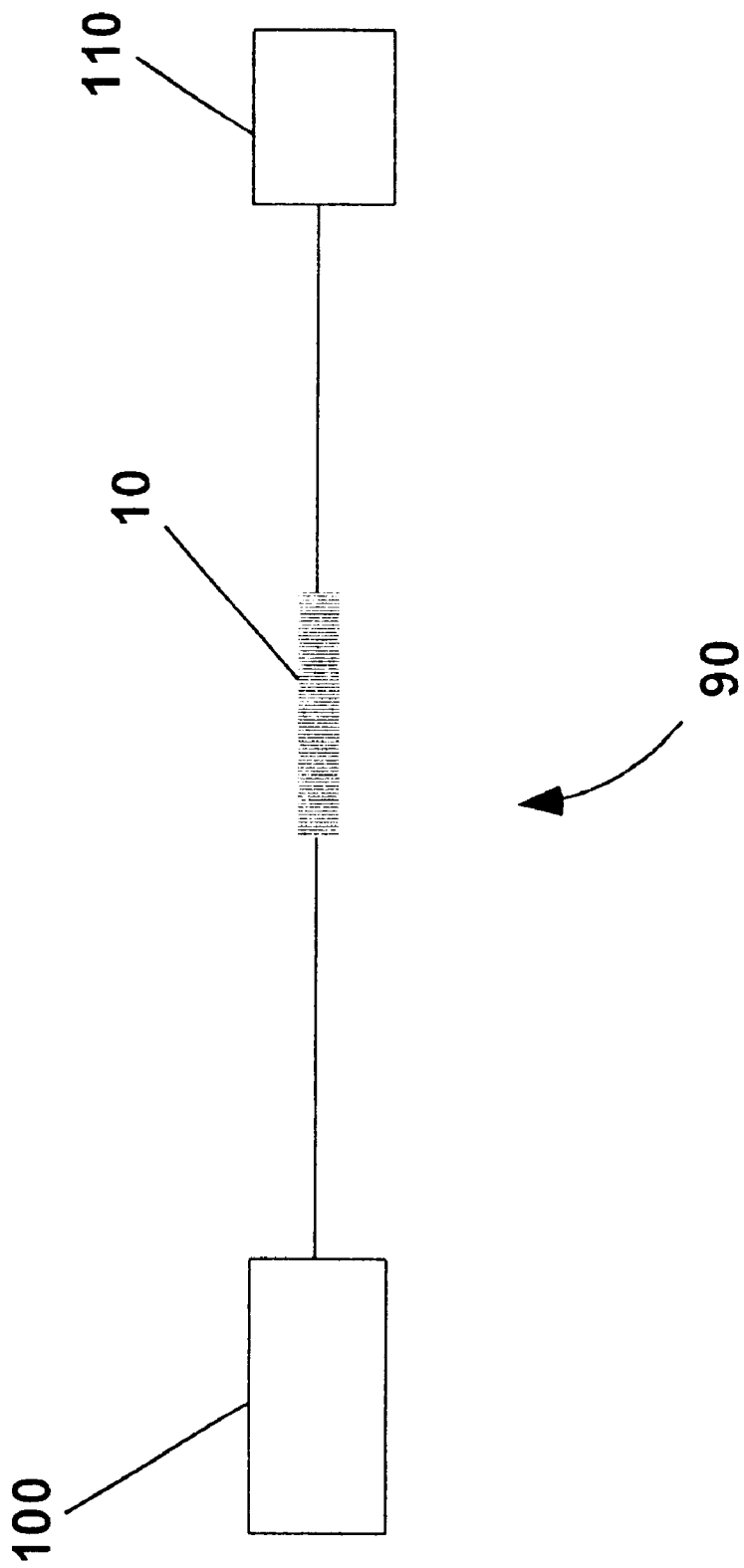
FIG. 2 depicts the optical sensor arrangement of the present invention.

FIG. 2 depicts the optical sensor arrangement 90 of the present invention, which employs the optical waveguide 10 shown in FIG. 1. In this arrangement, a light source 100 is coupled to the optical waveguide 10. Any light source known to those of ordinary skill in the art may be employed. In particular, the light source is a broadband light source. A detector 110 is also coupled to the optical waveguide 10. Any detector known to those of ordinary skill in the art may be employed. In particular, the detector may either be a spectrally based element that measures power spectral density or the detecting element may have a spectral filter and photo diode where the spectral filter converts the signal into an intensity based measurement. The detector is used to detect a resulting optical signal from the sensing mechanism interacting with the evanescent field.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. An optical sensor arrangement comprising:
   a light source;
   an optical waveguide coupled to the light source;
   at least one long period grating disposed within the optical waveguide, wherein the long period grating has a plurality of index perturbations spaced apart by a periodic distance $\Lambda$, wherein the long period grating promotes an excitation of confined propagating light into higher order modes causing an excitation of a sensing mechanism;
   wherein the sensing mechanism receives light coupled from the long period grating; and
   a detector coupled to the optical waveguide wherein the detector detects a resulting optical signal.

2. An optical sensor arrangement according to claim 1, wherein the periodic distance is irregular.

3. An optical sensor arrangement according to claim 2, wherein the periodic distance is $10\,\mu m \leq \Lambda \leq 1500\,\mu m$.

4. An optical sensor arrangement according to claim 1, wherein the periodic distance is $10\ \mu m \leq \Lambda \leq 1500\ \mu m$.

5. An optical sensor arrangement according to claim 1, wherein the sensing mechanism is selected from the group consisting of: an absorption mechanism; a polarization mechanism; a phase changing mechanism; an electromagnetic property changing mechanism; and a fluorescent signal.

6. An optical sensor arrangement according to claim 1, wherein the optical waveguide is selected from the group consisting of: a planar optical waveguide; an integrated optic waveguide; and a fiber optic waveguide.

7. An optical sensor arrangement according to claim 6, wherein the optical waveguide is a fiber optic waveguide.

* * * * *